No. 748,916. PATENTED JAN. 5, 1904.
G. C. E. DE BONNECHOSE.
PISTON JOINT.
APPLICATION FILED APR. 22, 1903.
NO MODEL.
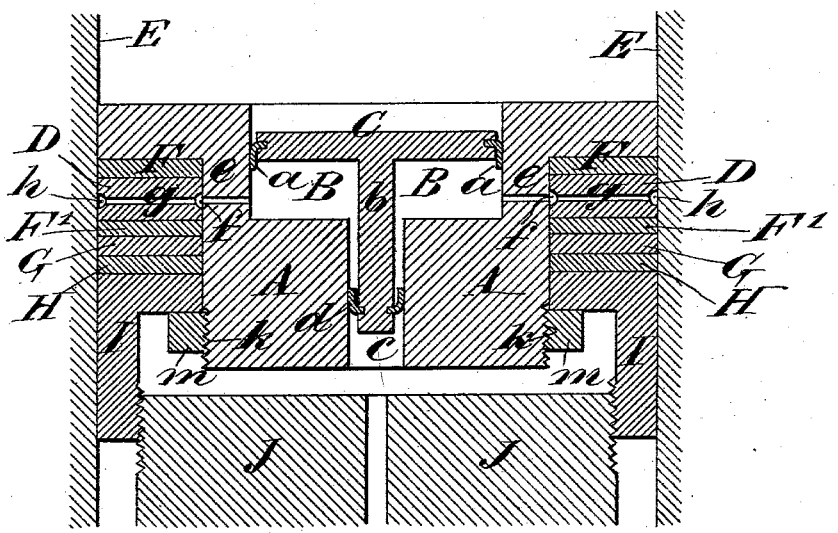
Witnesses.
Inventor
Gaston C. E. de Bonnechose No. 748,916. Patented January 5, 1904.

UNITED STATES PATENT OFFICE.

GASTON CHARLES EMILE DE BONNECHOSE, OF BOURGES, FRANCE.

PISTON-JOINT.

SPECIFICATION forming part of Letters Patent No. 748,916, dated January 5, 1904.

Application filed April 22, 1903. Serial No. 153,792. (No model.)

*To all whom it may concern:*

Be it known that I, GASTON CHARLES EMILE DE BONNECHOSE, a citizen of the French Republic, residing at Bourges, (Cher,) France, have invented certain new and useful Improvements in Piston-Packing, of which the following is a specification.

This invention relates to a piston-packing or joint which is especially applicable to pistons employed in air-cushions or springs, dynamometers, hydropneumatic brakes, and the like; and the object of the invention is to provide a packing means for a piston playing in a cylinder, wherein there shall be a pressure on the lubricating material, which interposes between the piston and the cylinder-wall and forms the retaining medium greater than that on the liquid or gaseous fluid incarcerated in the cylinder and under pressure and wherein the leakage of the lubricant under pressure is prevented to a practical extent by packing-rings of oiled leather or the like, which are themselves under a pressure greater than that of the lubricating material. The lubricating material insures an easy movement of the piston in the cylinder, with little resistance from friction, and the pressure on said lubricating material may or may not be proportional to that of the fluid compressed by the piston.

In the accompanying drawing, which illustrates one embodiment of the invention, the view is an axial longitudinal section of a cylinder with a plunger and piston therein.

E designates a cylinder or a part thereof, and J designates a plunger in the cylinder, said plunger carrying a packed piston A. In the outer face of the piston A is a cylindrical chamber B, in which plays a minor piston C, provided with a stem $b$, which plays in and is guided by a bore $c$ in the main piston. On the minor piston is a cup-packing $a$, and on its stem $b$ is a similar cup-packing $d$. The chamber B contains the lubricant, and pressure from the incarcerated fluid on the minor piston C forces the lubricant out laterally through passages $e$, formed in the wall of the main piston, and into passages $g$ in the metal ring D, which embraces a reduced portion of the main piston. In the inner face of the ring D is a circumferential distributing-groove $f$, and in its outer face is a similar groove $h$.

F and F' are packing-rings of oiled leather, which embrace the ring D on its opposite faces, and G H are similar packing-rings to impart breadth to the bearing-surface. A flanged follower I bears on the packing-rings and the latter are compressed by a nut $m$, which screws onto the reduced portion of the piston A. The plunger J is attached to the piston by screwing it into the open end of the follower I. When the piston A thus packed is forced inward in a manner to compress the fluid in the cylinder, pressure is applied to the minor piston C. As the lubricant in the chamber B cannot escape by reason of the packings $a$ and $d$, said lubricant is driven forcibly outward through the channels $g$ to the circumferential groove $h$, where it comes in contact with the inner wall of the cylinder and lubricates the piston.

It will be seen that the principle upon which the packing operates is that the lubricant is subjected to greater pressure than the fluid incarcerated in the cylinder, and, notwithstanding this fact, said lubricant is retained by the packing-rings or washers, which are themselves subjected automatically to a pressure greater than that to which the lubricant is subjected.

Care should be taken to make the reduced portion of the piston A which is embraced by the packing-rings or washers of such section that the ratio of this section to that of main portion of the piston shall be greater than the ratio of the section of the stem $b$ to that of the minor piston C.

In order that the purpose of the present invention may be the better understood, it may be well to state that in this packing the pressure on the lubricant is greater than that on the incarcerated fluid and also that the escape of the lubricant is prevented by packing-rings of elastic material, which themselves sustain a pressure higher than that of the lubricant, this pressure on the packing varying with the pressure on the lubricant.

Having thus described my invention, I claim—

1. The combination with a cylinder and a main compressing-piston therein, said piston having in it a chamber to contain a lubricant and lateral passages which extend from said chamber out to the periphery of the compressing-piston to carry the lubricant to said periphery, and a minor piston in said lubricant-chamber in the main compressing-piston and exposed to pressure from the fluid compressed by the last-named piston.

2. In a device for the purpose specified, the combination with a cylinder E, of the main piston playing therein and provided with a chamber B to contain a lubricant, and lateral passages therefrom to lead the lubricant toward the periphery, the minor piston C in said chamber and exposed to pressure from the fluid compressed by said piston, and the packing of the piston.

3. In a device for the purpose specified, the combination with the main piston A, having a reduced portion to receive the packing-rings, a chamber B for the lubricant, and lateral passages $e$ from said chamber for the lubricant, the minor piston C in the chamber B, the packing-rings F, the metal ring D, between the packing-rings and having passages $g$ for the lubricant, the follower I, and the nut $m$, which drives the follower up to the packing-rings, whereby the escape of the lubricant is prevented by a pressure applied to the packing-rings in excess of that on the lubricant and varying with the latter pressure.

In witness whereof I have hereunto signed my name in the presence of two subscribing witnesses.

GASTON CHARLES EMILE DE BONNECHOSE.

Witnesses:
    JULES ARMENGAUD, Jeune,
    MARCEL ARMENGAUD, Jeune.